United States Patent
Johnson et al.

(10) Patent No.: US 12,266,137 B2
(45) Date of Patent: Apr. 1, 2025

(54) IMAGE QUALITY CALIBRATION FOR MULTI-DEGREE-OF FREEDOM ACTUATOR

(71) Applicant: Raytheon Company, Arlington, VA (US)

(72) Inventors: Tim P. Johnson, Torrance, CA (US); Scott R. Foes, Torrance, CA (US); Joseph J. Ichkhan, Redondo Beach, CA (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 18/384,558

(22) Filed: Oct. 27, 2023

(65) Prior Publication Data

US 2024/0153140 A1    May 9, 2024

Related U.S. Application Data

(60) Provisional application No. 63/419,894, filed on Oct. 27, 2022.

(51) Int. Cl.
*G06T 7/80* (2017.01)
*H04N 23/695* (2023.01)

(52) U.S. Cl.
CPC ............. *G06T 7/80* (2017.01); *H04N 23/695* (2023.01); *G06T 2207/10032* (2013.01)

(58) Field of Classification Search
CPC ... G06T 7/70; G06T 7/80; G06T 2207/10032; H04N 23/695
See application file for complete search history.

(56) References Cited

U.S. PATENT DOCUMENTS

| | | | | |
|---|---|---|---|---|
| 6,084,227 A | * | 7/2000 | Rhoads | G01J 9/00 356/121 |
| 7,400,415 B2 | * | 7/2008 | Patzwald | G01B 11/162 356/614 |
| 7,796,833 B2 | * | 9/2010 | Polonskiy | G06V 20/13 382/207 |
| 9,006,633 B2 | * | 4/2015 | Tofsted | G02B 26/06 250/226 |
| 9,749,522 B2 | * | 8/2017 | Holmes | F16M 11/10 |
| 12,069,372 B2 | * | 8/2024 | Feng | G06T 7/70 |
| 12,106,517 B2 | * | 10/2024 | Feldman | H04N 17/002 |
| 2002/0017651 A1 | * | 2/2002 | Kato | H01L 33/505 257/89 |
| 2008/0212830 A1 | | 9/2008 | Minarik et al. | |

(Continued)

OTHER PUBLICATIONS

Hampson, et al. (Sep. 20, 2019) "High Precision Automated Alignment Procedure for Two-Mirror Telescopes," Applied optics, Engineering and Laboratory Note, Journal of Optical Society of America, vol. 58, No. 27, pp. 7388-7391.

*Primary Examiner* — Brian P Yenke
(74) *Attorney, Agent, or Firm* — Schwegman Lundberg & Woessner, P.A.

(57) ABSTRACT

A method and a system for optimizing the alignment of an optical system, such as a telescope, using a multi-degree-of freedom (DOF) actuator/hexapod and star field images. The method iteratively adjusts the hexapod in all DOFs using the damped least squares (DLS) optimization algorithm and dynamically changes the size of pixel windows to measure ensquared energy (ES) as a closed loop feedback.

20 Claims, 4 Drawing Sheets

(56) References Cited

U.S. PATENT DOCUMENTS

| | | | |
|---|---|---|---|
| 2010/0314534 A1* | 12/2010 | Campion | G01D 15/00 250/252.1 |
| 2011/0234787 A1* | 9/2011 | Tyc | G02B 23/16 348/82 |
| 2017/0366264 A1* | 12/2017 | Riesing | H04B 10/615 |
| 2024/0126073 A1* | 4/2024 | Shechtman | G02B 27/0025 |

* cited by examiner

- $X_d$ is each DOF from 1 to d
- $P_d$ is ES for each DOF from 1 to d
- $P_0$ is the initial ES
- $P_i$ is ES for each step S of Hexapod in all DOFs from 1 to i
- i is the number of optimization cycles for a window size of N x N with k total pixels
- K is the number of "pixel window reduction" iterations

IMAGE QUALITY CALIBRATION FOR MULTI-DEGREE-OF FREEDOM ACTUATOR

CROSS-REFERENCE TO RELATED APPLICATIONS

This patent application claims the benefits of U.S. Provisional Patent Application Ser. No. 63/419,894, filed on Oct. 27, 2022 and entitled "Image quality recovery method with multi-degree-of freedom (DOF) actuator using star field images," the entire content of which is hereby expressly incorporated by reference.

FIELD

The disclosure generally relates to optical systems and more specifically to alignment of a telescope for image quality calibration using a multi-degree-of freedom (DOF) actuator.

BACKGROUND

Optical systems generally have tight tolerances (microns and milliradians) and are sensitive to alignment shifts during operation after being launched in the field. Consequently, an optical system may have high image quality in the lab, then lower image quality in operation due to warping from thermal, vibration, shock, stress, settling, etc. An in-situ/automatic re-alignment or re-focus process is often needed. This usually involves an adjustment mechanism to a "compensator" (e.g., a hexapod), and a measurement method (e.g., feedback mechanism). Optical systems are typically aligned in the lab with an external device such as an interferometer. Ground-based telescopes often use a laser guide star (LGS) and wavefront (WF) sensor. As known, a laser guide star is an artificial star image created by scattering the laser from a layer in the atmosphere and is used in large telescopes to compensate for atmospheric distortion of light. However, a LGS cannot be used for space based sensors that do not view the atmosphere. Adaptive optics (AO) systems typically require a wavefront reference source of light called a guide star.

Some optical systems have built in capabilities to measure the phase of a reference wavefront (example: a star). These are typical on-axis optical systems, where the compensator motion only changes the wavefront focus and no other aberrations. However, the compensator motion of off-axis optical systems causes changes to other aberrations in the wavefront, besides simply focus. Accordingly, off-axis optical systems do not have a simple way to measure a reference wavefront phase.

One of the issues when aligning large FOV optical systems is the determination of how many field points should be measured and their distribution or field sampling. Ideally, a large number of field points should be measured, however, measurement of the entire field is usually not practical. When trying to determine the number of field points required to align a system with large FOV, the measurement of one axis field point does not yield sufficient information to obtain insight into the full field performance. For instance, if only one on-axis field point is measured, the results show misalignment, which may also be due to manufacturing errors and installation mismatches.

There are various image quality metrics such as wavefront error (WFE) or Ensquared Energy (EE). When our goal is to find the min or max of these metrics in an optimization algorithm these are called the merit function (MF). The MF can also be a weighted sum of various metrics. When the alignment compensator(s) have multiple degrees of freedom (DOF), the solution space becomes multivariate. Multivariate solution spaces often contain local mins and maxes that are not the global min or max.

The MF must be carefully chosen so the optimization algorithm can converge on the correct global solution and does not settle on false local solutions. To measure a reference wavefront required phase measurement capability. EE is a simpler measurement on a pixelated focal plane as this does not involve the wavefront phase. However, EE by itself is not a robust MF and is prone to many false local mins and maxes in the multivariate solution space.

SUMMARY

In some embodiments, the present disclosure is directed to a method for image quality calibration of an optical system using a multi-degree-of freedom (DOF) compensator. The method includes: a) receiving a first plurality of images of a scene including a plurality of targets by the optical system with the compensator at an initial position; b) selecting an initial pixel window of a first size around each of the plurality of targets in the first plurality of captured images, respectively; c) measuring an initial ensquared energy (ES) in each of the initial pixel windows; d) moving the compensator in a first DOF to a new position; e) capturing a second plurality of images of the scene at the new position of the compensator; f) repeating d to e for all of the multi-DOFs; g) utilizing the measured ES in each of the pixel windows as a merit function for a damped least squares (DLS) optimization method to move the compensator in all of the multi-DOFs; h) repeating c-g until a sum of ES in each of the pixel windows from all targets has reached a maximum; i) moving the compensator to a position where the ES in each of the pixel windows from all targets has reached the maximum; j) selecting a pixel window of a second size smaller than the first size; and k) repeating c to j for a predetermined number of times to obtain the image quality calibration of the optical system.

In some embodiments, the present disclosure is directed to a calibrated optical system that includes: a multi-degree-of freedom (DOF) compensator for moving the optical system in multi-DOFs; an image capturing device for capturing plurality of images of a scene; a plurality of server motors to move the image capturing device in all of the multi-DOFs; and a computer. The computer:
 a) receives a first plurality of images of a scene including a plurality of targets by the optical system with the compensator at an initial position;
 b) selects an initial pixel window of a first size around each of the plurality of targets in the first plurality of captured images, respectively;
 c) measures an initial ensquared energy (ES) in each of the initial pixel windows;
 d) moves the compensator in a first DOF to a new position;
 e) captures a second plurality of images of the scene at the new position of the compensator;
 f) repeats d to e for all of the multi-DOFs;
 g) utilizes the measured ES in each of the pixel windows as a merit function for a damped least squares (DLS) optimization method to move the compensator in all of the multi-DOFs;
 h) repeats c-g until a sum of ES in each of the pixel windows from all targets has reached a maximum;

i) moves the compensator to a position where the ES in each of the pixel windows from all targets has reached the maximum;

j) selects a pixel window of a second size smaller than the first size; and k) repeats c to j for a predetermined number of times to obtain the image quality calibration of the optical system.

BRIEF DESCRIPTION OF THE DRAWINGS

A more complete appreciation of the disclosure, and many of the attendant features and aspects thereof, will become more readily apparent as the disclosure becomes better understood by reference to the following detailed description when considered in conjunction with the accompanying drawings in which like reference symbols indicate like components.

DETAIL DESCRIPTION

In some embodiments, the present disclosure is directed to a method and system for optimizing the alignment of an optical system, such as a telescope, using a multi-degree-of freedom (DOF) actuator/hexapod and star field images, that does not rely on any secondary sensors. The method iteratively adjusts the hexapod in all DOFs using the damped least squares (DLS) optimization algorithm and a dynamically sized pixel window to measure ensquared energy (ES) as closed loop feedback. This way, a dynamic pixel window, which is a much more robust merit function (MF) for multivariate compensators, is being utilized by the present approach.

As known in the art, ensquared energy (ES) is an alternative to encircled energy and is typically used when quantifying image sharpness for digital imaging cameras using image pixels.

As shown in the attached drawings, in some embodiments, the process uses the DLS optimization algorithm with a custom merit function (e.g., ensquared energy) and pixel windows that vary (e.g., shrink) in size with each iteration cycle. For instance, ensquared energy is measured on a plurality of stars thru FOV, as the merit function for DLS optimization method with no constraints. Derivatives of the adjustments provide "direction of decent" in multi-dimensional space (DOF). The process then searches for a minimum along that "line" in the N-dimensions. Step size is then re-calculated on each optimization cycle using the DLS method.

Some embodiments of the present disclosure utilize a 6-DOF closed-loop servo Hexapod actuator having accuracy and stability commensurate with the precision optical step size requirements to support the process and optical tolerances. Hexapod avoids multiple actuator "layering" required to achieve more than 1 DOF, thus enhancing inherent opto-mechanical stability, reducing control and packaging complexity. Hexapod also features parallel-kinematic behavior for opto-mechanical stability, while actuators are more suitable for flight grade optical systems.

Figure 1:
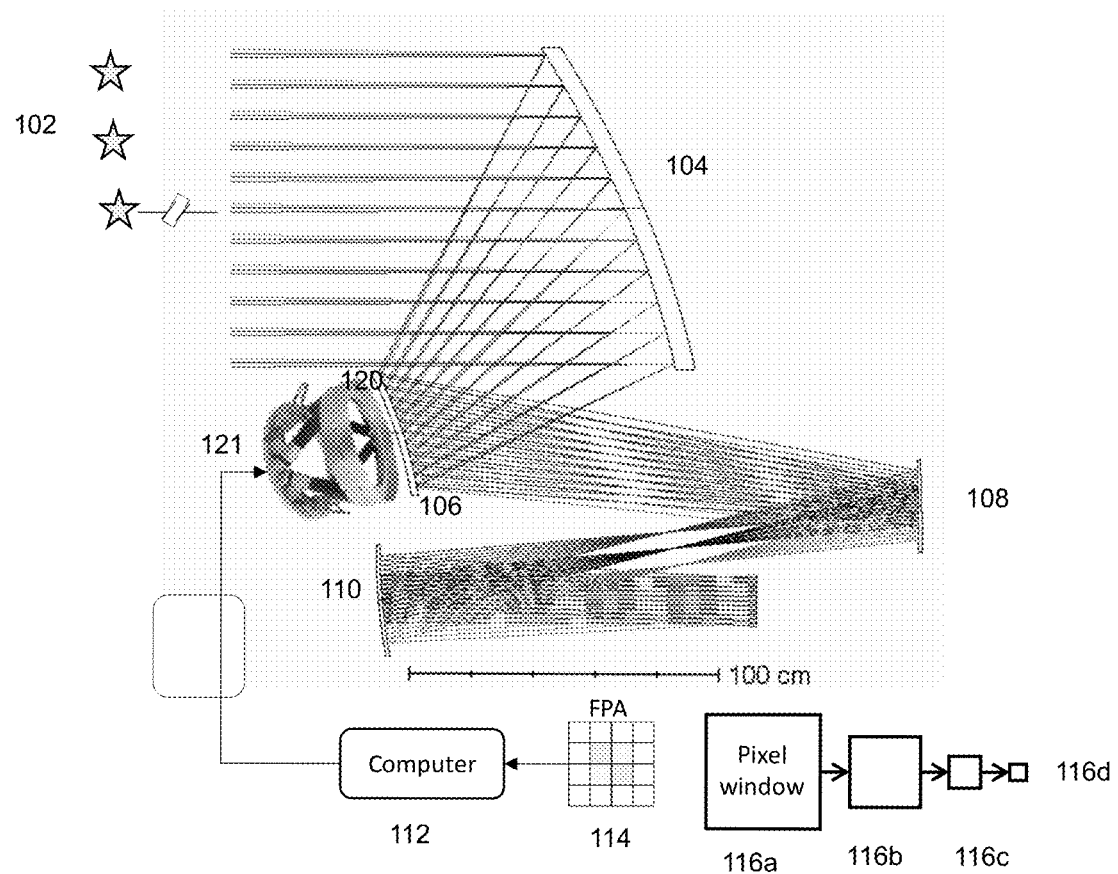
FIG. 1 illustrates an exemplary environment for alignment of a telescope using a multi-degree-of freedom (DOF) actuator, according to some embodiments of the disclosure.

FIG. 1 illustrates an exemplary environment for alignment of an optical system, such as a telescope, using a multi-degree-of freedom (DOF) actuator, according to some embodiments of the disclosure. As shown, a first image of a scene 102, for example image of a plurality of stars, is captured by mirrors 104, 106, 108 and 110 in an image capturing system 120, such as a telescope or camera, at a time $T_0$. The telescope or camera 120 is positioned on a compensator including a plurality of server motors 121, for example a hexapod, that is capable of moving in various DOFs (e.g., 5 DOFs). In some embodiments, the images of the stars may be captured and arranged such that, when viewed on a virtual array of pixels that map their positions in the scene 102 to the focal plane array (FPA) 114 of the telescope 120, each image is offset from every other image by a non-integer number of pixels. In some embodiments, the size of the pixels in the virtual array can be determined from estimated worst case point spread function (PSF) diameter when the optical systems is in its worst case misaligned/warped state.

An arbitrary pixel window size 106a (e.g., 10×10) for image of each star is selected or received by a computer or image processing system 112. The computer or image processing system 112 can be configured as part of the telescope or camera 120 or as a separate system in (wired or wireless) communication with telescope or camera 120. The computer or image processing system 112 determines an associated ensquared energy (ES) for each pixel window. In some embodiments, the ES can be determined from the intensity of the pixels in each pixel window. A translation between the stars and the orientation of the telescope 120 is calculated from the ES values of the pixel windows of the star images. A more detailed method for calculating ES is described in U.S. Pub. No. 2008/0212830, entitled: "Efficient Calculation of Ensquared Energy in an Imaging System," the entire contents of which is hereby expressly incorporated by reference.

The compensator 121 is stepped in one DOF and the ES is measured for each star pixel window. Every time the DOF is adjusted a new set of images is obtained by the telescope/camera system 120. The compensator is then returned to its original position, stepped in the next DOF, and ES is measured again for the new set of images. This process is repeated for all DOFs. The DSL algorithm is then utilized to determine the direction along which the multivariate DOF space to move along. Subsequently, the compensator is stepped along this line in multivariate DOF space while ES is measured on each star pixel window for each step. The compensator steps and ES measurements are repeated until the sum of ES from all stars (i.e., the merit function, MF) has reached a maximum and begins going back down. The compensator is then returned to the position of maximum ES. This is one complete optimization cycle for this pixel window size.

The process of optimization cycle is repeated using the same pixel window size, from which a new optimization direction may be found. A total of about 5-10 optimization cycles is typical before there is no further gain in the MF.

The pixel window size is then reduced and the process described above is repeated for the new pixel window size. The pixel window size is gradually reduced from, for example, from a 10×10 window to a 5×5 window. In some embodiments, the minimum pixel window size is determined by the Q value or the diameter of the nominal PSF relative to a pixel in a perfectly aligned system. The size of the pixel window can be determined in a closed loop feedback based on how well consistent the merit function is improving. This way, the signal to noise ratio (SNR) gradually improves as the compensator is being aligned and the pixel window size is being reduced. Every pixel contains noise so the less pixels used to measure a single star will increase the SNR. The approach is simultaneously aligning the system and carving out unnecessary pixels to measure each star more efficiently.

Figure 2:
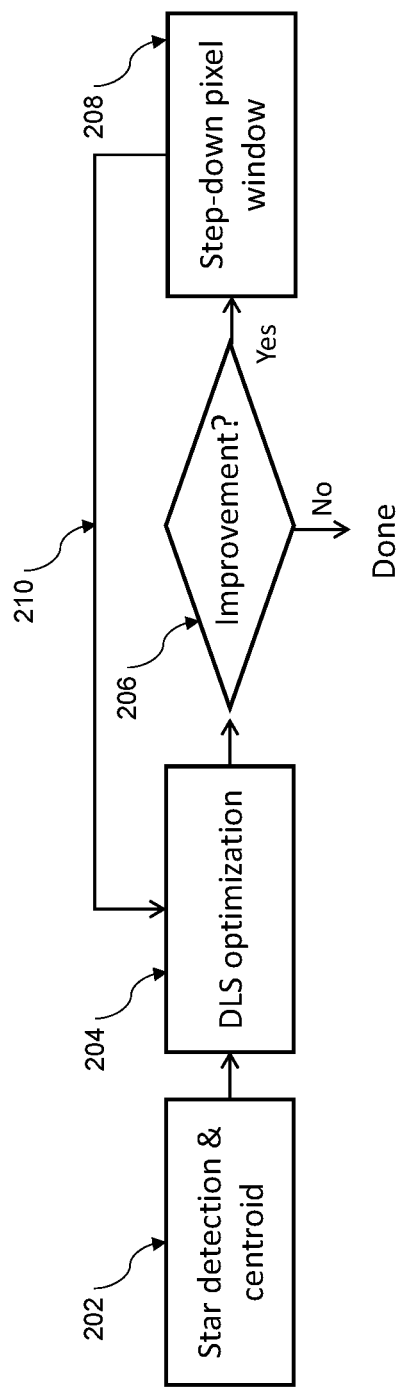
FIG. 2 shows a simplified exemplary process flow diagram for alignment of an optical system, according to some embodiments of the present invention.

FIG. 2 shows a simplified exemplary process flow diagram for alignment of an optical system, according to some embodiments of the present invention. As shown in block 202, a plurality of targets (e.g., stars) is detected, a first image for each star is captured, centroid of each star in the captured image is determined and a pixel window with an initial size is selected for each target (star) based on their respective centroid. In some embodiments, the process estimates the center of an actual pixel on the captured image array relative to the center of a virtual pixel since the ensquared energy associated with a given virtual pixel varies according to the offset of the point source from the center of the actual pixel. The ES is calculated for each pixel window of the initial size for each target/star, as an initial value. As explained above, with respect to FIG. 1, the compensator 121 is stepped in each DOF and ES is measured for each star pixel window for each DOF for a new set of images obtained.

In block 204, DLS optimization is used to adjust the compensator in all DOF directions (multivariate DOF space), as explained above and in more detailed below. The compensator is stepped along the multivariate DOF space and ES is measured for each star pixel window for each step. The compensator is adjusted in small steps in each direction to find optimal direction for its movement. An optimum step size along that direction is then calculated. The compensator is stepped along the optimum direction until merit function of the DLS has been optimized. New images are taken and merit function (ES) for the DLS between every step is calculated.

When there is no further improvement (206), that is, no further gain in the MF of the DLS optimization method, the process is completed and the compensator would be in its optimum position. When there is improvement, the pixel window size is reduced and the process is repeated from block 204 for a predetermined number of times.

Figure 3:
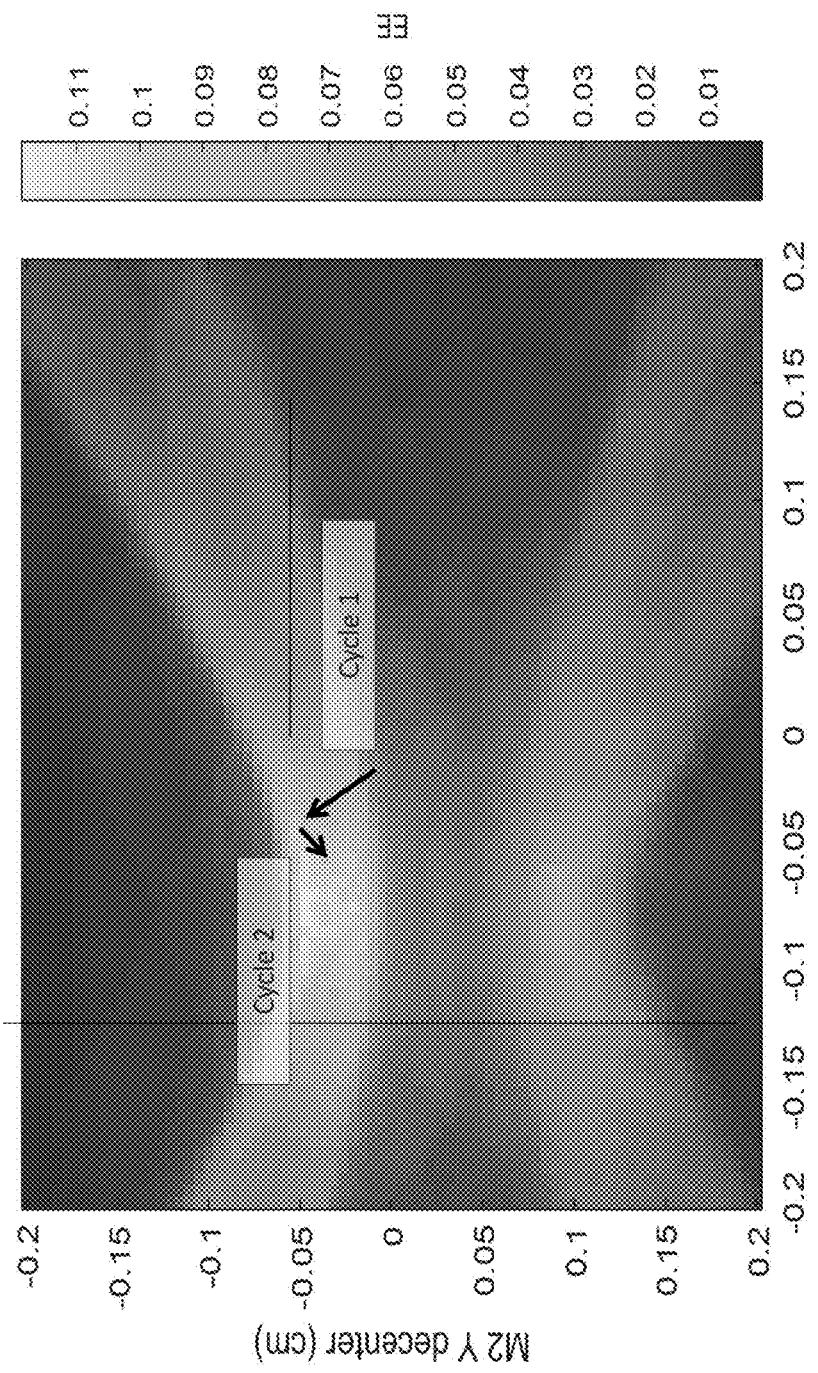
FIG. 3 depicts an exemplary plot of an optimization slice (in two-dimensions) in a 5D space, according to some embodiments of the present invention.

FIG. 3 depicts an exemplary plot of an optimization slice (in two-dimensions) in a 5D space, according to some embodiments of the present invention. In this example, a merit function P (ensquared energy, RMS spot radius, etc.) is a function of 5 hexapod DOFs: P(X, Y, Z, θx, θy). Therefore, the optimization space is a 5D array. The plot shows ensquared energy (EE) vs. X, Y, for a single Monte Carlo trial of tolerances applied to the telescope. As explained above, each optimization cycle, calculates the maximum slope line and computes steps along that line. As shown, there are two maximums in EE (one for iteration cycle 1 and another for iteration cycle 2), which result in sub-optimal optimization. An optimization algorithm with a poorly defined merit function (for example ES on a single pixel) would likely settle on one of the local false solutions.

Figure 4:
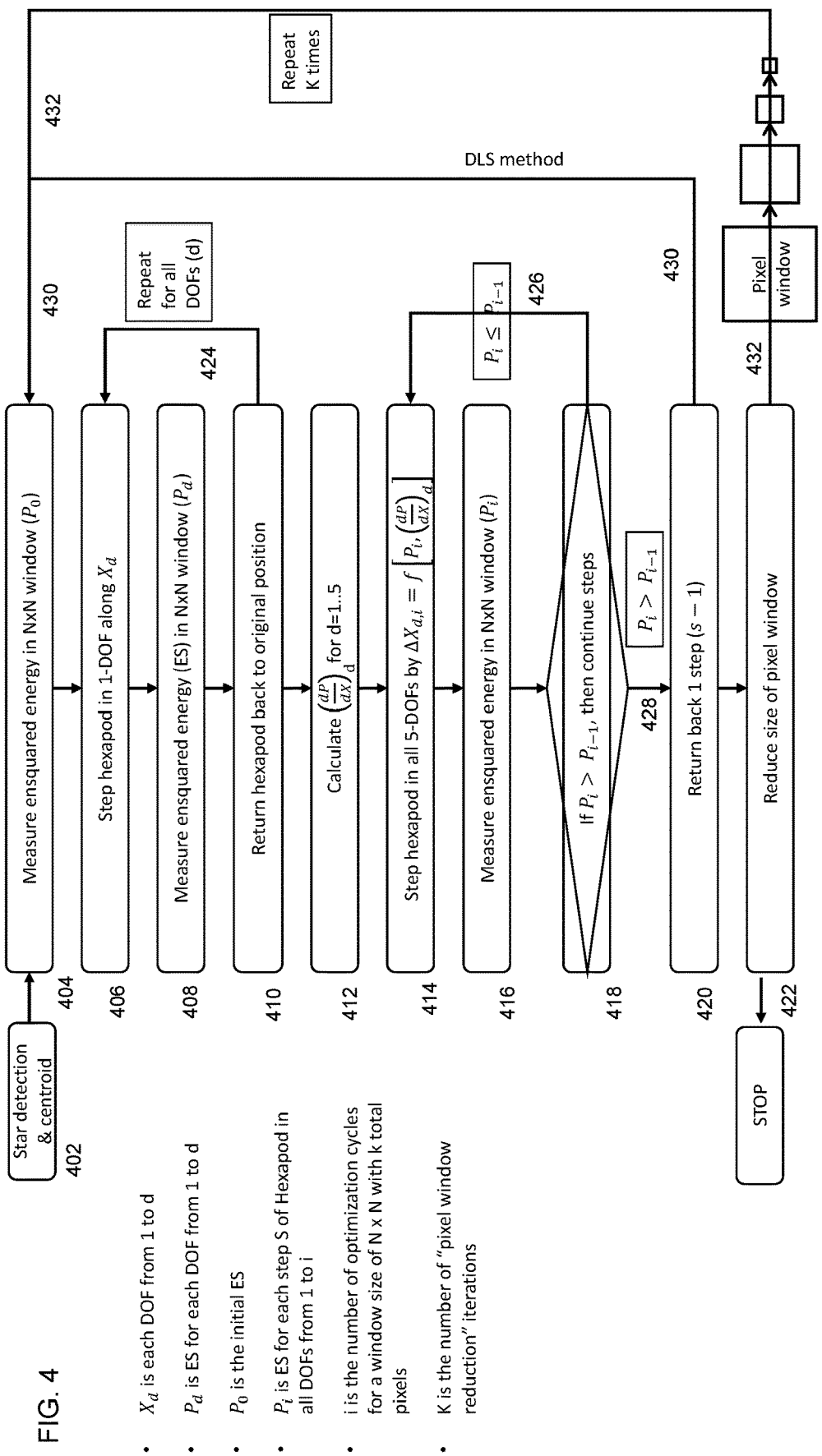
FIG. 4 shows a more detailed exemplary process flow diagram for alignment of an optical system, according to some embodiments of the present invention.

FIG. 4 shows a more detailed exemplary process flow diagram for alignment of an optical system, according to some embodiments of the present invention. In block 402, the targets (stars) are detected, their image is captured and centroids of each star is determined, using conventional methods. In block 404, an initial ES is calculated for an initial pixel window of N×N around centroid of each detected star. In block 406, a compensator (e.g., a hexapod) is stepped along one degree of freedom $X_d$, and ES $P_d$ is calculated for the initial pixel window size of N×N at each moved position for this DOF $X_d$ of the hexapod in block 408.

The hexapod is then returned to its original position (block 410) and the process in blocks 406-410 is repeated for all DOFs (424). In block 412, the maximum slope line $$\left(\frac{dP}{dX}\right)_d$$

along which the hexapod needs to be moved for each DOF (multivariate DOF space) is calculated. The slope lines (derivatives) provide direction of movement decent in multi-dimensional (N) space (DOFs). The process searches for a minimum along that line in the N-dimensions. The hexapod is then moved in multivariate DOF space by the calculated maximum slope line $$\Delta X_{d,i} = f\left[P_i, \left(\frac{dP}{dX}\right)_d\right]$$

in block 414 and ES is calculated for each initial pixel window size N×N for the current optimization cycle.

In block 416, when the calculated ES for the current optimization cycle $P_i$ is less than or equal to the ES for the previous optimization cycle ($P_i \leq P_{i-1}$) (block 418), blocks 414-418 are repeated until $P_i > P_{i-1}$. (428). When $P_i$ is larger than the ES for the previous optimization cycle, the hexapod is stepped back to its previous position for the previous optimization cycle (i−1), in block 420. This yields a position of the hexapod for the current optimization cycle.

The optimization process is then repeated (430), for example, for i iterations. As explained above, the process uses the DLS optimization algorithm with the calculated ES as the merit function (with no other constraints) for the current pixel windows' size. After i optimization cycles (430), the pixel window size is reduced in block 422 and a new iteration (K+1) starts for the new pixel window size (432). The "pixel window size" iteration are repeated k times until a desired (predetermined) calibration accuracy is achieved.

In some embodiments, this new approach avoids local minimums that usually exist with point spread function (PSF) size-based optimization criterion by gradually stepping down the size of pixel windows. This method works especially well for larger WFE (e.g., 2-4 waves RMS) and thus is more robust than typical WF or phase-retrieval methods. The approach is also well-suited for numerous passive and active electro-optical systems, including Far-Field Strehl ratio recovery for active systems propagating laser beams on various fixed or moving platforms.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modi-

The invention claimed is:

1. A method for image quality calibration of an optical system using a multi-degree-of freedom (DOF) compensator, the method comprising:
   a) receiving a first plurality of images of a scene including a plurality of targets by the optical system with the compensator at an initial position;
   b) selecting an initial pixel window of a first size around each of the plurality of targets in the first plurality of captured images, respectively;
   c) measuring an initial ensquared energy (ES) in each of the initial pixel windows;
   d) moving the compensator in a first DOF to a new position;
   e) capturing a second plurality of images of the scene at the new position of the compensator;
   f) repeating d to e for all of the multi-DOFs;
   g) utilizing the measured ES in each of the pixel windows as a merit function for a damped least squares (DLS) optimization method to move the compensator in all of the multi-DOFs;
   h) repeating c-g until a sum of ES in each of the pixel windows from all targets has reached a maximum;
   i) moving the compensator to a position where the ES in each of the pixel windows from all targets has reached the maximum;
   j) selecting a pixel window of a second size smaller than the first size; and
   k) repeating c to j for a predetermined number of times to obtain the image quality calibration of the optical system.

2. The method of claim 1, wherein the compensator is a hexapod.

3. The method of claim 1, wherein the targets are stars.

4. The method of claim 1, wherein the optical system is a telescope or a camera.

5. The method of claim 1, wherein step g comprises calculating a maximum slope line along which the compensator needs to be moved for each DOF to provide direction of movement decent in multi-DOFs.

6. The method of claim 1, wherein the first size of the initial pixel window is 10×10.

7. The method of claim 1, wherein the predetermined number of times is in a range of 5 to 10 times.

8. A calibrated optical system comprising:
   a multi-degree-of freedom (DOF) compensator for moving the optical system in multi-DOFs;
   an image capturing device for capturing plurality of images of a scene;
   a plurality of server motors to move the image capturing device in all of the multi-DOFs; and
   a computer for:
   a) receiving a first plurality of images of a scene including a plurality of targets by the optical system with the compensator at an initial position;
   b) selecting an initial pixel window of a first size around each of the plurality of targets in the first plurality of captured images, respectively;
   c) measuring an initial ensquared energy (ES) in each of the initial pixel windows;
   d) moving the compensator in a first DOF to a new position;
   e) capturing a second plurality of images of the scene at the new position of the compensator;
   f) repeating d to e for all of the multi-DOFs;
   g) utilizing the measured ES in each of the pixel windows as a merit function for a damped least squares (DLS) optimization method to move the compensator in all of the multi-DOFs;
   h) repeating c-g until a sum of ES in each of the pixel windows from all targets has reached a maximum;
   i) moving the compensator to a position where the ES in each of the pixel windows from all targets has reached the maximum;
   j) selecting a pixel window of a second size smaller than the first size; and
   k) repeating c to j for a predetermined number of times to obtain the image quality calibration of the optical system.

9. The calibrated optical system of claim 8, wherein the compensator is a hexapod.

10. The calibrated optical system of claim 8, wherein the targets are stars.

11. The calibrated optical system of claim 8, wherein the image capturing device is a telescope.

12. The calibrated optical system of claim 8, wherein the image capturing device is a camera.

13. The calibrated optical system of claim 8, wherein process in g comprises calculating a maximum slope line along which the compensator needs to be moved for each DOF to provide direction of movement decent in multi-DOFs.

14. The calibrated optical system of claim 8, wherein the first size of the initial pixel window is 10×10.

15. The calibrated optical system of claim 8, wherein the predetermined number of times is in a range of 5 to 10 times.

16. A calibrated optical system comprising:
   Means for moving the optical system in multi-DOFs;
   means for capturing a plurality of images of a scene;
   means for moving the image capturing device in all of the multi-DOFs; and
   means for:
   a) receiving a first plurality of images of a scene including a plurality of targets by the optical system with the compensator at an initial position;
   b) selecting an initial pixel window of a first size around each of the plurality of targets in the first plurality of captured images, respectively;
   c) measuring an initial ensquared energy (ES) in each of the initial pixel windows;
   d) moving the compensator in a first DOF to a new position;
   e) capturing a second plurality of images of the scene at the new position of the compensator;
   f) repeating d to e for all of the multi-DOFs;
   g) utilizing the measured ES in each of the pixel windows as a merit function for a damped least squares (DLS) optimization method to move the compensator in all of the multi-DOFs;
   h) repeating c-g until a sum of ES in each of the pixel windows from all targets has reached a maximum;
   i) moving the compensator to a position where the ES in each of the pixel windows from all targets has reached the maximum;
   j) selecting a pixel window of a second size smaller than the first size; and
   k) repeating c to j for a predetermined number of times to obtain the image quality calibration of the optical system.

17. The calibrated optical system of claim 16, wherein the compensator is a hexapod.

18. The calibrated optical system of claim 16, wherein the targets are stars.

19. The calibrated optical system of claim 16, wherein the image capturing device is a telescope.

20. The calibrated optical system of claim 16, wherein the image capturing device is a camera.

* * * * *